United States Patent
Akbay et al.

(10) Patent No.: US 7,974,855 B2
(45) Date of Patent: Jul. 5, 2011

(54) SYSTEM AND METHOD FOR IDENTIFYING, REPRESENTING AND EVALUATING INFORMATION AND DECISION FLOW REQUIREMENTS AND PROCESSES IN A TRANSACTIONAL BUSINESS SYSTEM

(75) Inventors: Kunter Seref Akbay, Niskayuna, NY (US); Richard Paul Messmer, Rexford, NY (US); Christopher Donald Johnson, Clifton Park, NY (US); Angela Neff Patterson, Blacksburg, VA (US); Navneet Kapoor, Haryana (IN); Marc Pavese, Stamford, CT (US); Peter Arnold Kalish, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1687 days.

(21) Appl. No.: 11/021,418

(22) Filed: Dec. 27, 2004

(65) Prior Publication Data

US 2006/0143029 A1    Jun. 29, 2006

(51) Int. Cl.
*G06Q 10/00* (2006.01)
(52) U.S. Cl. ................................. 705/2; 705/4
(58) Field of Classification Search .................. 705/4, 1
See application file for complete search history.

(56) References Cited

U.S. PATENT DOCUMENTS

| | | | | |
|---|---|---|---|---|
| 4,831,526 | A * | 5/1989 | Luchs et al. | 705/4 |
| 5,537,315 | A * | 7/1996 | Mitcham | 705/4 |
| 5,752,236 | A * | 5/1998 | Sexton et al. | 705/4 |
| 5,926,817 | A * | 7/1999 | Christeson et al. | 707/10 |
| 5,956,687 | A * | 9/1999 | Wamsley et al. | 705/1 |
| 5,987,433 | A * | 11/1999 | Crapo | 705/36 R |
| 6,343,272 | B1 * | 1/2002 | Payne et al. | 705/4 |
| 6,456,979 | B1 * | 9/2002 | Flagg | 705/4 |
| 6,862,573 | B2 * | 3/2005 | Kendall et al. | 705/7 |
| 6,915,487 | B2 * | 7/2005 | Costigan et al. | 715/771 |
| 7,168,045 | B2 * | 1/2007 | Fliess et al. | 715/771 |
| 2003/0236689 | A1 | 12/2003 | Casati et al. | |
| 2004/0138934 | A1 | 7/2004 | Johnson et al. | |

OTHER PUBLICATIONS

Akbay et al., "Method for Re-engineering of Business Processes", U.S. Appl. No. 10/959,769 dated Oct. 7, 2004.

* cited by examiner

*Primary Examiner* — Gerald J. O'Connor
*Assistant Examiner* — Hiep V. Nguyen
(74) *Attorney, Agent, or Firm* — Richard A. DeCristofaro (57) ABSTRACT

A system for representing information and decision flow requirements in a transactional business process is provided. The system comprises an information gathering object and a decision object. The information gathering object represents a piece of information used in the transactional business system and the decision object represents a satisfying condition for achieving an objective associated with the transactional business system. The system further comprises one or more information channels that link the information gathering objects to the one or more decision objects. The information channels represent the information and decision flow requirements within the transactional business system.

16 Claims, 4 Drawing Sheets

SYSTEM AND METHOD FOR IDENTIFYING, REPRESENTING AND EVALUATING INFORMATION AND DECISION FLOW REQUIREMENTS AND PROCESSES IN A TRANSACTIONAL BUSINESS SYSTEM

BACKGROUND

The invention relates generally to transactional business processes and more particularly to a system and method for identifying and representing information and decision flow requirements in a transactional business system.

A business process is a set of logically related activities performed to achieve a business outcome or goal. In general, a business process determines the nature of work within a business system and is typically defined by a set of workflows designed to achieve a goal of a business system. Examples of typical business systems may include factories, supply chains, administrative processes or functional processes such as underwriting, servicing and originations. Examples of business processes within business systems may include determining a risk class for a life insurance application, calculating the amount to be paid on an insurance claim, determining how to allocate a payment to different customer accounts or providing a quote for leasing equipment or vehicles.

In business systems such as those mentioned above, businesses typically spend significant time and resources gathering data, collating it and organizing it for the purpose of making business process decisions. Generally, the amount of information that is actually used for making business process decisions is much less and often different than the volume of information collected. However, as will be appreciated by those skilled in the art, information is considered as an important organizational resource. A well-managed business process should effectively manage its information flow requirements through the business system. In general, a business process that is analyzed with an 'information-oriented' view enables better organizational efficiency or effectiveness. Therefore, there is a need for an efficient system and method for identifying and representing information and decision flow requirements within a transactional business system.

BRIEF DESCRIPTION

Embodiments of the present invention address this and other needs. In one embodiment, a system for representing the information requirements for decision making in a transactional business system is provided. The system comprises an information source node that represents a piece of information that is used in the transactional business system and a decision node. The decision node represents a decision that is made based upon the information provided by the information represented by the information source node toward an objective associated with the transactional business system. The system further comprises a connector that links the information source node to the decision node, in which the information from the information source node will be used and which represents the category of the information provided from the information source node.

In another embodiment, a system for representing information and decision flow requirements in a transactional business system is provided. The system comprises an information gathering object and a decision object. The information gathering object represents a piece of information used in the transactional business system and the decision object represents a satisfying condition for achieving an objective associated with the transactional business system. The system further comprises one or more information channels that link the information gathering objects to the one or more decision objects. The information channels represent the information and decision flow requirements within the transactional business system.

In yet another embodiment, a method for identifying information requirements for decision making in a transactional business system is provided. The method comprises representing the transactional business information and generating an information and decision flow diagram from the transactional business information representation. The method further comprises adding one or more process elements, which may include those elements that describe time-based behaviors where the system state changes as a function of time, for example status of a queue or the availability of a resource. These process elements are added to the generated information and decision flow diagram and used to build a process flow diagram based upon the one or more process elements. The process flow diagram, with these additional process elements can be used as a simulation of a recommended transactional business process. Finally, the method comprises generating a cost and benefit analysis for the recommended transactional business process based upon the process flow diagram.

DRAWINGS

These and other features, aspects, and advantages of the present invention are described in the following detailed description that references the accompanying drawings. Like characters represent like parts throughout the drawings, and the drawings include the following Figures.

DETAILED DESCRIPTION

Disclosed herein is a system for efficiently representing the information requirements for decision making in a transactional business system. Also disclosed herein is a system for efficiently representing the information and decision flow within such a transactional business system, and a method to establish an improved process design from a financial or business system objective.

As will be appreciated by those skilled in the art, information flow is fundamental for any business process. A business process may be defined as a series of decisions linked and enabled by information, wherein the output of one decision may be input to one or more subsequent decisions. A business process usually contains sub-process units that relate to how this information is obtained and utilized to make decisions. Not having the right information at the right time creates information bottlenecks. Information bottlenecks, in turn, may negatively affect throughput, cost and the ability to satisfy a customer's requirements for a product or service. Embodiments of the present invention, as will be described in greater detail below, disclose systems for effectively representing and managing information and decision flow within a transactional business system. In addition, embodiments of the present invention address a number of questions that are essential to the design of any business system such as:

What information is needed to complete the organizational tasks?

From whom, when, and how can this information be generated and procured?

What information needs to be passed on through the value chain because other information is dependent on this information? and In what form and when can this transfer of information happen in the most robust way?

Figure 1:
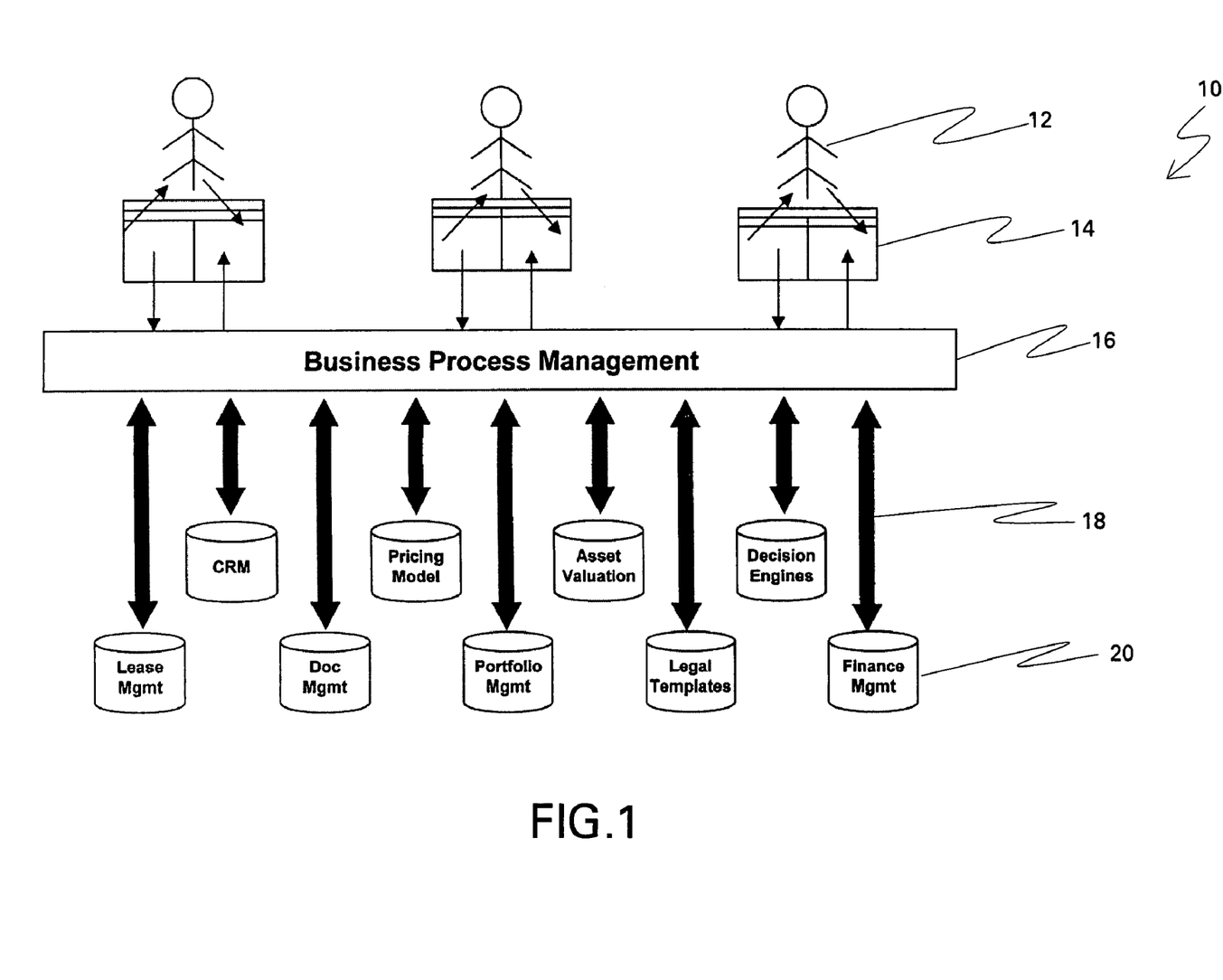
FIG. 1 is an illustration of a transactional business system in accordance with an embodiment of the present technique.

FIG. 1 is an illustration of a transactional business system as it relates to one embodiment of the present technique. As shown in FIG. 1, the transactional business system 10 comprises decision makers 12, web screens 14 for a user interface, a business process management tool set 16, software adapters 18 and enterprise applications and legacy systems 20. The decision makers 12 are presented with the required information needed to make a decision, in the form of the web screens 14. The web screens 14 contain information related to a decision such as setting asset values, quantifying risk etc.

In general, the decision makers 12 are not required to know the source or the destination of the information they process, but make decisions based on the information. While the term "web screen" has been used in describing this embodiment, it is understood that a variety of different systems could be used to display the required information to the decision makers without departing from the general techniques and systems described herein. For example, such display systems could include computer applications based on HTML or other markup languages, custom applications that provide the necessary information, dedicated client/server systems for accessing the information in the underlying legacy systems, and other display techniques that present the decision maker with the information needed to make the appropriate decision.

The web screens 14 are displayed when a decision maker picks up a transaction from a work queue. The web screens 14 contain all the information needed to make a decision and the information that needs to be generated as a result of the decision. The web screens 14 are presented to the decision makers 12 as a result of a business process management workflow that resides within a business process management tool set 16. The business process management toolset 16 connects to existing enterprise applications and legacy systems 20 through a series of software adapters 18. Legacy systems include any of the information resources in an organization. Examples of legacy systems include, but are not limited to, all forms of information processing hardware and software owned by an organization, such as mainframes, personal computers, serial terminals, networks, databases, operating systems, applications, data order entry systems, and other programs.

Figure 2:
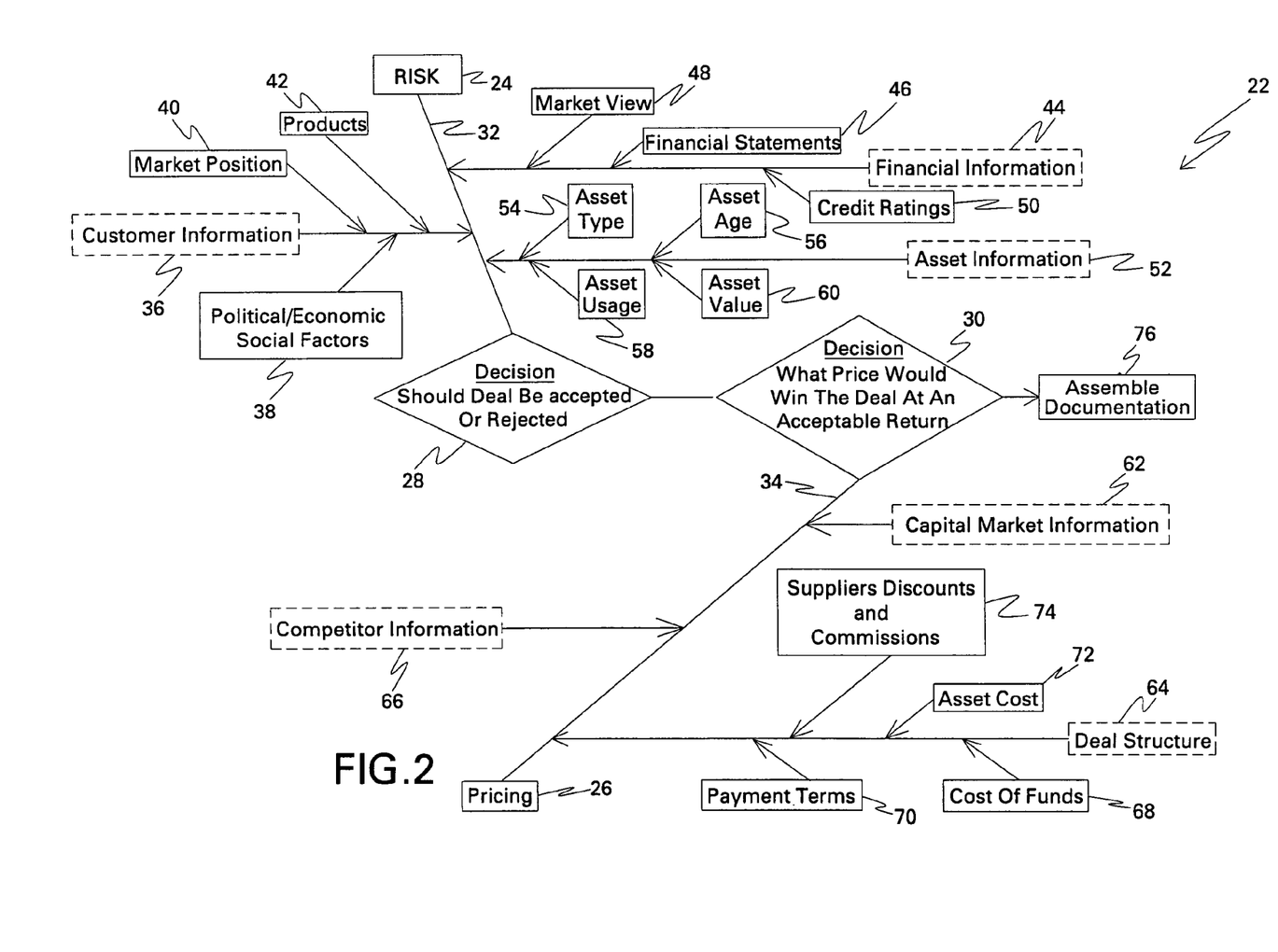
FIG. 2 is an illustration of a system for representing information requirements for decision-making in the transactional business system of FIG. 1, in accordance with one embodiment of the present invention.

FIG. 2 is an illustration of a system for representing information requirements for decision-making in the transactional business system of FIG. 1, in accordance with one embodiment of the present invention. In this exemplary embodiment, the system 22 comprises two information source nodes, 24 and 26. The information source nodes represent pieces of information that are used in the transactional business system as will be described in greater detail below. Referring to FIG. 2, the information source node 24 represents risk information and the information source node 26 represents pricing information, wherein the risk information and the pricing information are exemplary representations of sources of information that affect a business decision that is implemented within the transactional business system 10.

The system 22 also includes decision nodes and connectors that link the information source nodes to the decision nodes. Referring to FIG. 2 again, the decision nodes are represented by the reference numerals 28 and 30, and the connectors are represented by the reference numerals, 32 and 34. The connectors 32 and 34 link the information source nodes 24 and 26 to the decision nodes 28 and 30 respectively. The decision nodes, 28 and 30 represent a decision that is made based upon the information provided by the information represented by the information source nodes, 24 and 26 and an objective associated with the transactional business system 22. In accordance with the present embodiment, the objective of the transactional business system is to create a process for assembling documentation for the commencement of a business deal, represented generally by the reference numeral 76. The connectors represent categories of information provided by the information source nodes.

Referring to FIG. 2 again, the information categories associated with the risk information source node 24 may comprise, for example, customer information 36, financial information 44 and asset information 52. In accordance with the present embodiment, each information category represents a different functional responsibility associated with the information source. The system 22 further comprises information coupled to the information categories, wherein the information further classifies the functional responsibilities. For example, the customer information category 36 may represent several functional responsibilities such as, for example, political, economic and social factors affecting the customer, market position and products associated with the customer, represented by the reference numerals, 38, 40 and 42 respectively. The political, economic and social factors are a measure of the reliability/stability factor associated with the customer in terms of his/her payback capability, the market position is a measure of the perception of a product or an organization from a customer's view-point and the products represent the kinds of products that the customer is engaged in.

Similarly, the financial information category 44 may represent different functional responsibilities such as, for example, financial statements 46, market view 48, and credit rating 50, and the asset information category 52 may represent functional responsibilities such as, for example, asset type 54, asset age 56, asset usage 58 and asset value 60. The financial statements provide an overall status of liquidity in terms of capital assessment associated with the deal; the market view provides an analysis of the overall risk associated with the existing market; the credit rating is an assessment of the organization's performance by a third party; the asset type is the distribution of assets in terms of real estate, stock markets, bank deposits, etc; the asset age is a measure of the appreciation value of the assets of an organization over time; the asset usage determines how the assets are deployed and made use of by the organization; and the asset value is the net market value of an organization's assets on a per-share basis.

Therefore, each functional responsibility represents a factor that affects the objective associated with the transactional business system. Similarly, the information categories associated with the pricing information node may comprise capital market information 62, deal structure 64 and competitor information 66. The deal structure information category 64 may in turn represent several functional responsibilities associated with the information category such as, for example, cost of funds 68, payment terms 70, asset cost 72 and supplier discounts and commissions 74. The cost of funds is a measure of the cost associated with the initial investment, the payment terms determine the structure in which the customer makes the payment to the organization, and the asset cost is a measure of the total cost of the asset. Therefore, the system for representing information requirements in accordance with the present embodiment uses the information source nodes, the decision nodes and the connectors to efficiently identify and represent all the pieces of information needed to achieve a particular business objective.

Figure 3:
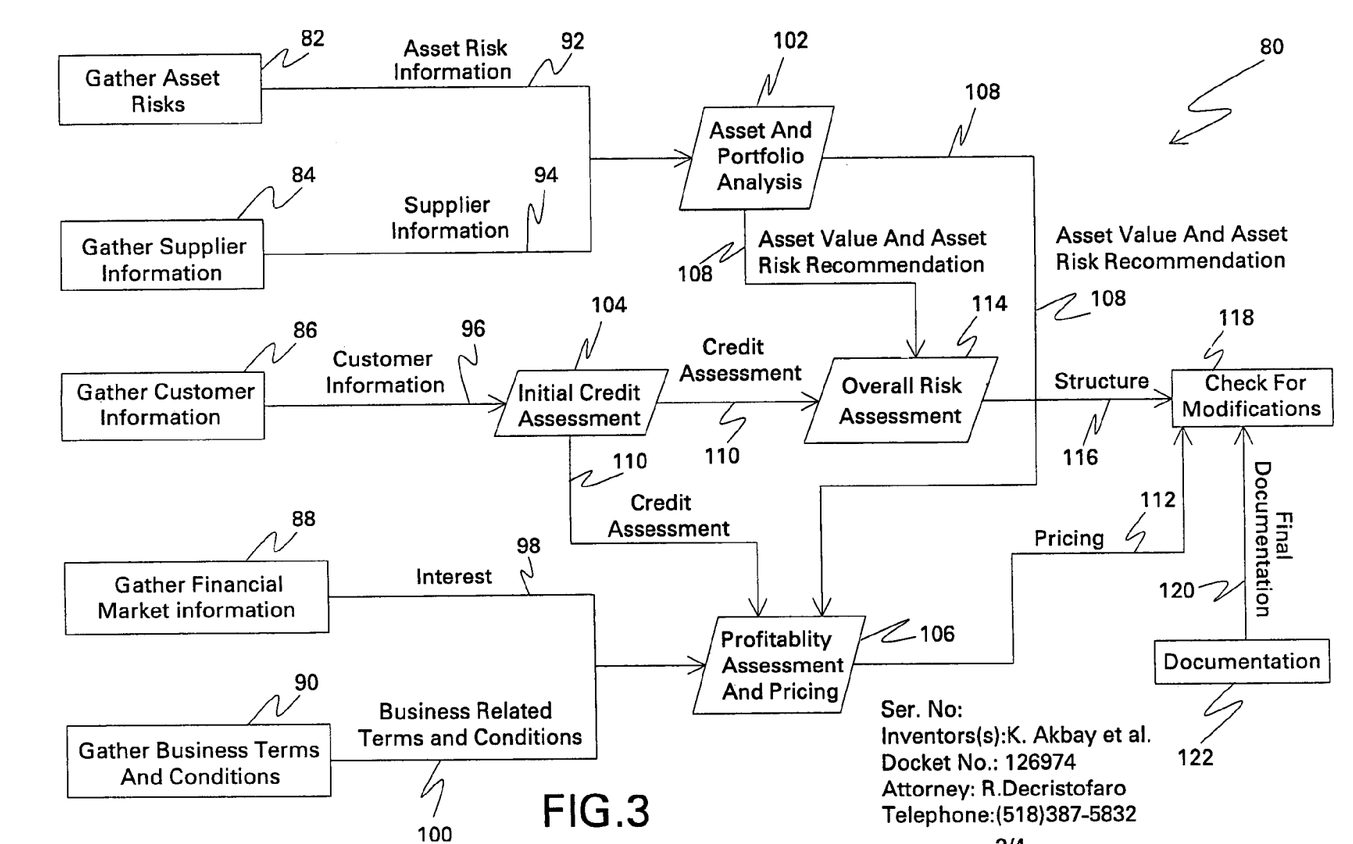
FIG. 3 is an illustration of a system for representing information and decision flow within the transactional business system of FIG. 1, in accordance with one embodiment of the present invention.

FIG. 3 is an illustration of a system for representing information and decision flow within the transactional business system of FIG. 1, in accordance with one embodiment of the present invention. The information and decision flow representation of FIG. 3, is generated based on the information requirements representation described in FIG. 2, as will be described in greater detail below.

Referring to FIG. 3, the system 80 comprises information gathering objects, decision objects and one or more information channels that link the information gathering objects to the decision objects. Although the representation system may make use of many different representational objects, the illustrated embodiment in FIG. 3 uses boxes to represent the information gathering objects and decision objects. However, one of ordinary skill in the art will recognize that any other type of representation that is suitable for display may also be used to represent the information gathering objects and decision objects. It will be understood that the use of boxes is merely exemplary and that other representations can be used without departing from the systems and techniques described herein.

As shown in FIG. 3, the information gathering boxes represent a piece of information used in the transactional business system. The information channels represent one or more information categories of the information provided from the information gathering boxes. The information categories represent functional responsibilities associated with the information gathering boxes. In particular, the information channels represent the information and decision flow requirements within the transactional business system, as will be described in greater detail below. The decision boxes are information-handling boxes that represent a decision that is made based upon the information provided by the information gathering boxes. In particular, the decision boxes represent a satisfying condition for achieving an objective associated with the transactional business system.

Referring to FIG. 3, the information gathering boxes are represented by the reference numerals 82, 84, 86, 88, 90, 118 and 122. In accordance with the present embodiment, the information represented in the information gathering boxes is transferred along the information channels 92, 94, 96, 98 and 100, 108, 110, 112, 116 and 120. The information represented by the information channels may then be transferred to one or more decision boxes 102, 104, 106 and 114 as will be described in greater detail below.

Referring to FIG. 3 again, the decision box 102 represents a decision, "asset and portfolio analysis", that is made based on the asset risk information and the supplier information represented by the information channels, 92 and 94 respectively. Therefore, the information represented by the information channels is transferred from the information gathering boxes to the decision boxes and these information channels further represent all the information needed to make a decision for the particular decision box to which they lead. For example, as shown in FIG. 3, the "Asset Value and Asset Risk Recommendation" information channel 108 contains all the information generated as a result of the information represented by the decision box 102. The information represented by the information channel 108 may then be transferred downstream to subsequent decision boxes 114 and 106, and finally to other information channels, such as information channels 116 and 112, respectively.

Similarly, the decision box 106 represents a decision, "profitability assessment and pricing", that is made based on the interest information, business related terms and conditions and the credit assessment, represented by the information channels 98, 100 and 110 respectively. The "Pricing" information channel 112 contains all the information generated as a result of the information represented by the decision box 106. The information represented by the information channels 112 and 116 are then input into information gathering boxes 118 and 122 that represent the information needed for assembling the final documentation for the business process. As discussed with reference to FIG. 2, the objective of the transactional business system is to create a process for assembling documentation for the commencement of a business deal, represented by the reference numeral 122.

Figure 4:
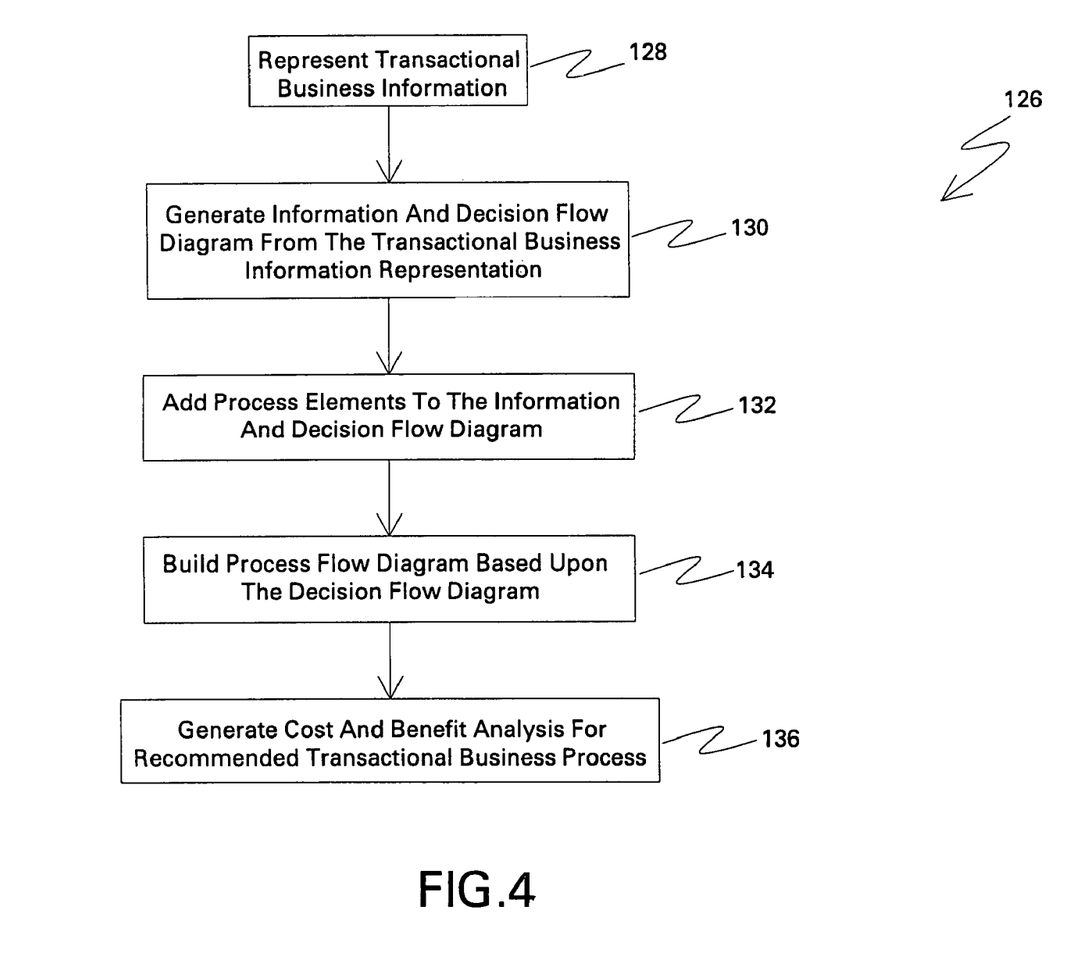
FIG. 4 is a flowchart describing the overall process for identifying information requirements for decision making in the transactional business system shown in FIG. 1, and designing a business process driven by these information and decision flow requirements.

FIG. 4 is a flowchart describing the overall process for identifying information requirements for decision making in the transactional business system shown in FIG. 1, and designing a business process driven by these information and decision flow requirements. Initially, one or more business drivers are identified. The types of markets served and the value delivered to these markets are determined. The overall goal or business objective used to measure the success of the business transactional system is identified.

Referring to FIG. 4, in step 128, the information requirements are identified and represented according to the process described in FIG. 2. In step 130, an information and decision flow diagram is generated based on the information requirements representation according to the process described in FIG. 3. In step 132, process elements are added to the information and decision flow diagram.

The process elements define how the information is collected, processed and transferred within the transactional business system. For example, the process elements may be representative of routing probabilities, the labor consumed at each process step, transaction complexity, transaction dollar size, or process priorities. Further, in step 132, roles are defined and rework flow is identified. That is, each process element is defined by a role that is representative of a responsibility associated with a particular human resource within the business transactional process. Referring to FIG. 3 above, the roles may comprise, for example, Asset and Portfolio analysis, Credit Assessment, or Profitability Assessment and Pricing. Rework flow may be further identified in this step. Referring again to FIG. 3 above, if the output from the "asset and portfolio analysis" and the "initial credit assessment" decision boxes, represented by the reference numerals 102 and 104 respectively, is not acceptable, then the business terms and conditions associated with the business process may be reworked again, either for the approval or the rejection of the business deal. The output of this step is a "should be process" flowchart. As used herein, the "should be" process is the process that should be followed by the organization in order to achieve a business objective.

Once the "should be" process is agreed upon, a working model of the process is developed that implements the suggested business process changes. In step 134, a process flow diagram is built based upon the process elements. This step builds upon the "should be" process flowchart by adding dynamic elements. Using simulation technology, the business process is put into motion. The simulation describes the flow within the transactional business process and the direction of the flow is governed by the process flow diagram. In addition, business rules, such as prioritization of work are embedded in the simulation. Cycle time distributions for individual steps are entered. Staff assignments are made to individual process steps and transactional flow rates are included. The goal of this step is to understand if business measurements defined in step 128 can be achieved with the should-be process.

In step 136, a cost and benefit analysis is generated, based on the process flow diagram developed in step 134. This step involves projecting the costs and benefits of the changes recommended in the process. These projections can be performed by using ranges of probabilistic output for the various process changes that describe the estimated financial risk and financial return for the change to the process. These probabilistic results can be generated by creating a simulation of the revised business process in the process flow diagram and making use of one or more of: discrete event simulation, agent based simulation and continuous dynamic simulation systems.

Furthermore, each process element, as described above, may be varied in different simulation runs to provide an understanding of the trade-off between cost and benefit. As mentioned above, each process element in the business transactional process is representative of the effort of a particular human resource and captures the amount of time that each resource spends on each step in the transactional business process. Therefore, in accordance with the present technique to perform an efficient cost and benefit analysis, the number of different human resources may be varied to determine the impact on the transaction throughput and resource cost associated with the business process.

The embodiments illustrated and described above provide an efficient system for representing the information requirements and managing information and decision flow within a transactional business system. The system enables the right information to reach the right decision maker at the right time and the right cost. The above system may be applied to a variety of transactional processes, such as, for determining a risk class for a life insurance application, allocating a payment to one or more customer accounts and providing a quote for leasing equipment. In particular, the transactional business system, described in accordance with the present invention, is built around the information and communication requirements of a business system rather than a process hierarchy of products or services.

As will be appreciated by those skilled in the art, traditional techniques for representing information workflow typically start by defining a process hierarchy that depicts an existing business process. A step-wise assessment of each process step in the process hierarchy then identifies opportunities for elimination of non-value added tasks within the business process. One drawback of this technique is that the business may only make incremental process changes that typically have a low cost and also a low benefit. In addition, there may be an increased cost associated with the software implementation of representing such workflows when the software vendor or service provider attempts to incorporate unnecessary or inefficient existing process steps into their solution. Another drawback with traditional workflow software implementations is that the solution provided by the workflow may not provide sufficient flexibility to meet the demands of the business, thereby forcing the business to modify its processes to accommodate the encoded processes in the software.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising computer readable media for representing the information requirements for decision making in a transactional business system, the system comprising:
    an information source node, wherein the information source node represents a piece of information that is used in the transactional business system;
    a decision node, wherein the decision node represents a decision that is made based upon the information provided by the information represented by the information source node and an objective associated with the transactional business system; and
    a connector, that links the information source node to the decision node, in which the information from the information source node will be used and which represents the category of the information provided from the information source node.

2. The system of claim 1, wherein the transactional business system comprises processes for determining a risk class for a life insurance application, allocating a payment to one or more customer accounts and providing a quote for leasing equipment.

3. The system of claim 1, wherein the information categories represent functional responsibilities associated with the information source node.

4. The system of claim 3, wherein the functional responsibilities represent a plurality of factors that affect the objective associated with the transactional business system.

5. The system of claim 3, further comprises information coupled to the information categories, wherein the information further classifies the functional responsibilities.

6. A system comprising a computer readable media for representing information and decision flow requirements in a transactional business system, the system comprising: an information gathering object, wherein the information gathering object represents a piece of information used in the transactional business system; a decision object, wherein the decision object represents a satisfying condition for achieving an objective associated with the transactional business system; and one or more information channels that link the information gathering objects to the one or more decision objects, wherein the one or more information channels represent the information and decision flow requirements within the transactional business system.

7. The system of claim 6, wherein the business transactional system comprises processes for determining a risk class for a life insurance application, allocating a payment to a plurality of customer accounts and providing a quote for leasing equipment.

8. The system of claim 6, wherein the decision object represents a decision that is made based upon the information represented by the one or more information gathering objects.

9. The system of claim 6, wherein the one or more information channels represent one or more categories of the information provided from the information gathering objects.

10. The system of claim 9, wherein the information categories represent a plurality of functional responsibilities that affect the satisfying condition.

11. The system of claim 9, wherein the one or more information channels represent information that is transferred from the one or more information gathering objects to the one or more decision objects.

12. The system of claim 11, wherein the one or more information channels further represent information that is transferred downstream from the one or more decision objects to one or more subsequent decision objects comprising the transactional business system.

13. A computer readable media storing software that, when executed, causes a computer to perform a method for identifying information and decision flow requirements in a transactional business system, the method comprising:

representing the transactional business information;

generating an information and decision flow diagram from the transactional business information representation;

adding one or more process elements to the generated information and decision flow diagram;

building a process flow diagram based upon the one or more process elements, wherein the process flow diagram is a simulation of a recommended transactional business process; and generating a cost and benefit analysis for the recommended transactional business process based upon the process flow diagram.

14. The method of claim 13, wherein the transactional business information is represented by one or more information sources, one or more decision objects and one or more connectors that link the one or more information sources and the one or more decision objects.

15. The method of claim 13, wherein the information and decision flow diagram is a representation of information and decision flow requirements within the transactional business system.

16. The method of claim 13, wherein the process elements comprise information associated with the collection, processing and transferring of information and decision flow requirements within the transactional business system.

* * * * *

UNITED STATES PATENT AND TRADEMARK OFFICE
CERTIFICATE OF CORRECTION

Page 1 of 1

PATENT NO. : 7,974,855 B2
APPLICATION NO. : 11/021418
DATED : July 5, 2011
INVENTOR(S) : Akbay et al.

It is certified that error appears in the above-identified patent and that said Letters Patent is hereby corrected as shown below:

In Fig. 3, Sheet 3 of 4, delete "
```
Ser. No:
Inventors(s):K. Akbay et al.
Docket No.: 126974
Attorney: R.Decristofaro
Telephone:(518)387-5832
            3/4
```
".

In Column 8, Line 43, in Claim 6, delete "comprising a" and insert -- comprising --, therefor.

Signed and Sealed this
Fourteenth Day of February, 2012

David J. Kappos
*Director of the United States Patent and Trademark Office*